United States Patent
Sano et al.

(10) Patent No.: US 8,766,506 B2
(45) Date of Patent: Jul. 1, 2014

(54) STATOR CORE

(75) Inventors: Shinya Sano, Toyota (JP); Isao Kato, Toyoake (JP)

(73) Assignees: Toyota Jidosha Kabushiki Kaisha, Aichi-ken (JP); Aisin Seiki Kabushiki Kaisha, Aichi-ken (JP)

( * ) Notice: Subject to any disclaimer, the term of this patent is extended or adjusted under 35 U.S.C. 154(b) by 131 days.

(21) Appl. No.: 13/289,206

(22) Filed: Nov. 4, 2011

(65) Prior Publication Data

US 2012/0112594 A1 May 10, 2012

(30) Foreign Application Priority Data

Nov. 5, 2010 (JP) ................................ 2010-248312

(51) Int. Cl.
*H02K 1/12* (2006.01)
*H02K 1/14* (2006.01)
*H02K 1/06* (2006.01)

(52) U.S. Cl.
CPC .................. *H02K 1/146* (2013.01); *H02K 1/06* (2013.01); *H02K 1/14* (2013.01)
USPC .......... 310/216.073; 310/49.01; 310/216.069; 310/216.074; 310/216.091; 310/216.093; 310/216.096; 310/111

(58) Field of Classification Search
CPC ............ H02K 1/06; H02K 1/14; H02K 1/146
USPC ..................... 310/159, 216.001, 216.073, 49, 310/216.069, 71, 74, 93, 96, 111
IPC ................................................ H02K 1/12, 1/14
See application file for complete search history.

(56) References Cited

U.S. PATENT DOCUMENTS

| | | | | |
|---|---|---|---|---|
| 519,097 | A * | 5/1894 | Schmid .................. | 310/216.059 |
| 3,068,375 | A * | 12/1962 | Kohlhagen ..................... | 310/164 |
| 4,647,802 | A * | 3/1987 | Konecny ................ | 310/216.075 |
| 5,844,346 | A * | 12/1998 | Kolomeitsev et al. ..... | 310/254.1 |
| 6,194,805 | B1 * | 2/2001 | Heese et al. .................. | 310/166 |
| 7,884,520 | B2 * | 2/2011 | Ishida et al. ........... | 310/216.079 |
| 2005/0099086 | A1 * | 5/2005 | Schunk et al. ................ | 310/216 |

(Continued)

FOREIGN PATENT DOCUMENTS

| | | |
|---|---|---|
| JP | 64-050729 A | 2/1989 |
| JP | 2002-0369429 A | 12/2002 |

(Continued)

OTHER PUBLICATIONS

Partial English translation of Japanese Office Action for corresponding JP Patent Application JP 2010-248312 issued on Oct. 9, 2012.

*Primary Examiner* — John K Kim
(74) *Attorney, Agent, or Firm* — Sughrue Mion, PLLC (57) ABSTRACT

A stator core includes a cylindrical yoke and teeth that are disposed in an inner circumference surface of the yoke along its circumferential direction and that are subjected to magnetic flux from the rotor of the rotating electrical device. The teeth include a trapezoidal tooth that has a trapezoidal cross section that is taken vertically along a central axis of the yoke and an oddly shaped tooth of which a tip section has the same shape as the trapezoidal tooth and a base section from the tip section to the yoke has a different shape from the trapezoidal tooth.

8 Claims, 13 Drawing Sheets

(56) References Cited

U.S. PATENT DOCUMENTS

| | | | |
|---|---|---|---|
| 2009/0021089 A1* | 1/2009 | Nashiki | 310/46 |
| 2009/0127972 A1* | 5/2009 | Ishida et al. | 310/218 |
| 2009/0174280 A1* | 7/2009 | Prudham | 310/216.022 |
| 2010/0117465 A1* | 5/2010 | Kamiya et al. | 310/51 |
| 2010/0123426 A1* | 5/2010 | Nashiki et al. | 318/701 |
| 2010/0253176 A1* | 10/2010 | Ovrebo et al. | 310/216.073 |

FOREIGN PATENT DOCUMENTS

| | | |
|---|---|---|
| JP | 2006-311738 A | 11/2006 |
| JP | 2008-160939 A | 7/2008 |
| JP | 2008-167593 A | 7/2008 |
| JP | 2010-115057 A | 5/2010 |
| JP | 2010-248311 A | 11/2010 |

* cited by examiner

STATOR CORE

INCORPORATION BY REFERENCE

The disclosure of Japanese Patent Application No. 2010-248312 filed on Nov. 5, 2010 including the specification, drawings and abstract is incorporated herein by reference in its entirety.

BACKGROUND OF THE INVENTION

1. Field of the Invention

The invention of the present application relates to a stator core.

2. Description of the Related Art

Figure 8:
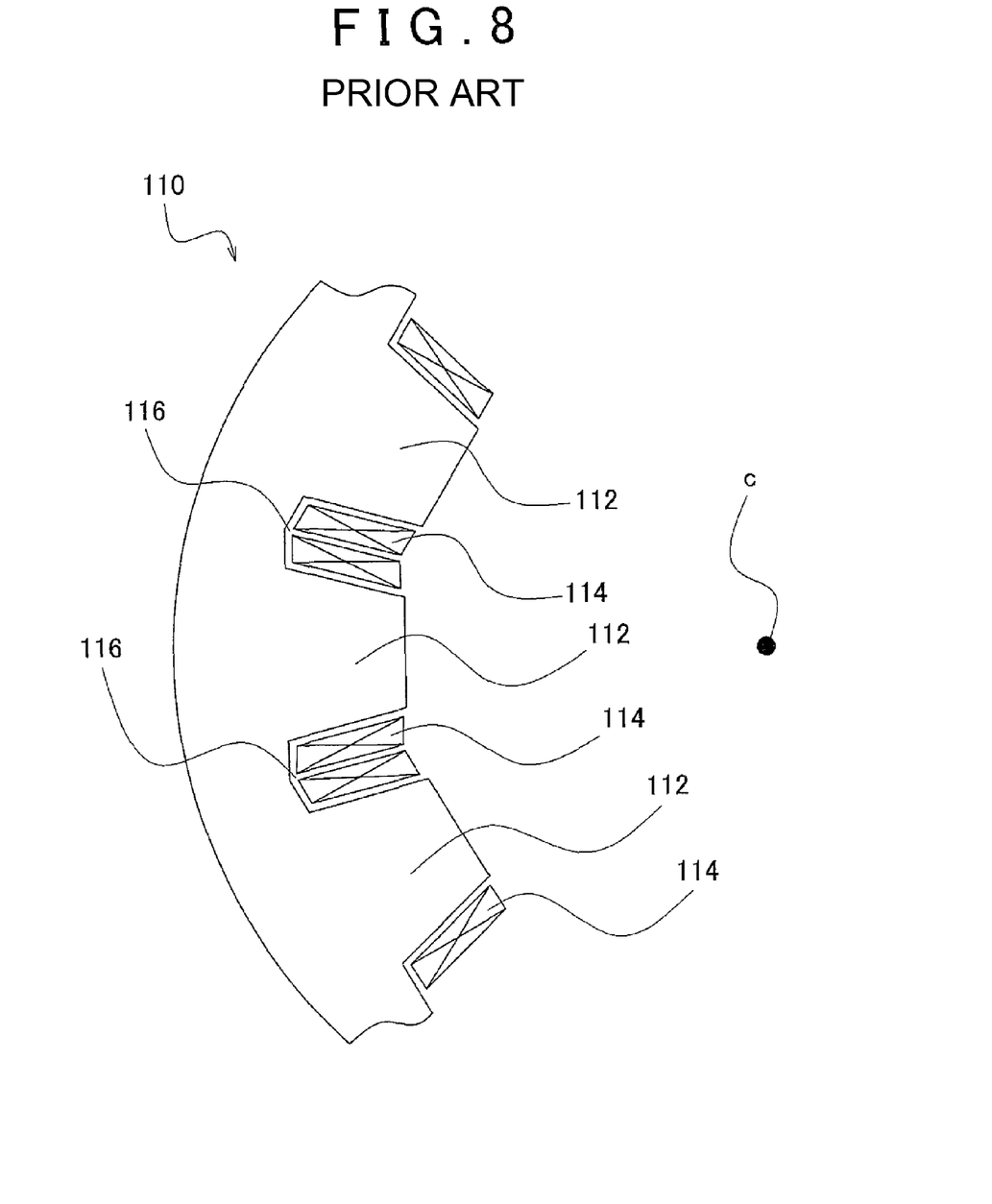
FIG. 8 is a view that illustrates the stator core according to the related art.

A rotating electrical device such as a motor or a generator is provided with a stator that generates rotating magnetic field to rotate a rotor. The stator includes an approximately cylindrical stator core and a coil, and the coil is assembled to a tooth (pole tooth) that is disposed in the stator core. A plurality of teeth are disposed in an inner circumference surface of the stator core along its circumferential direction, and a gap between adjacent teeth is referred to as a slot. In order to improve density of the coil (ratio of volume of the coil occupying a space of the slot) in the slot, a tooth that is disclosed in Japanese Patent Application Publication No. 2008-160939 and referred to as a trapezoidal tooth is used, for example. The trapezoidal tooth has a trapezoidal cross section that is taken vertically along a central axis C of a stator core 110 as shown in FIG. 8, and the tooth is formed so as to have a narrower width in a direction toward the central axis C of the stator core 110.

Figure 9:
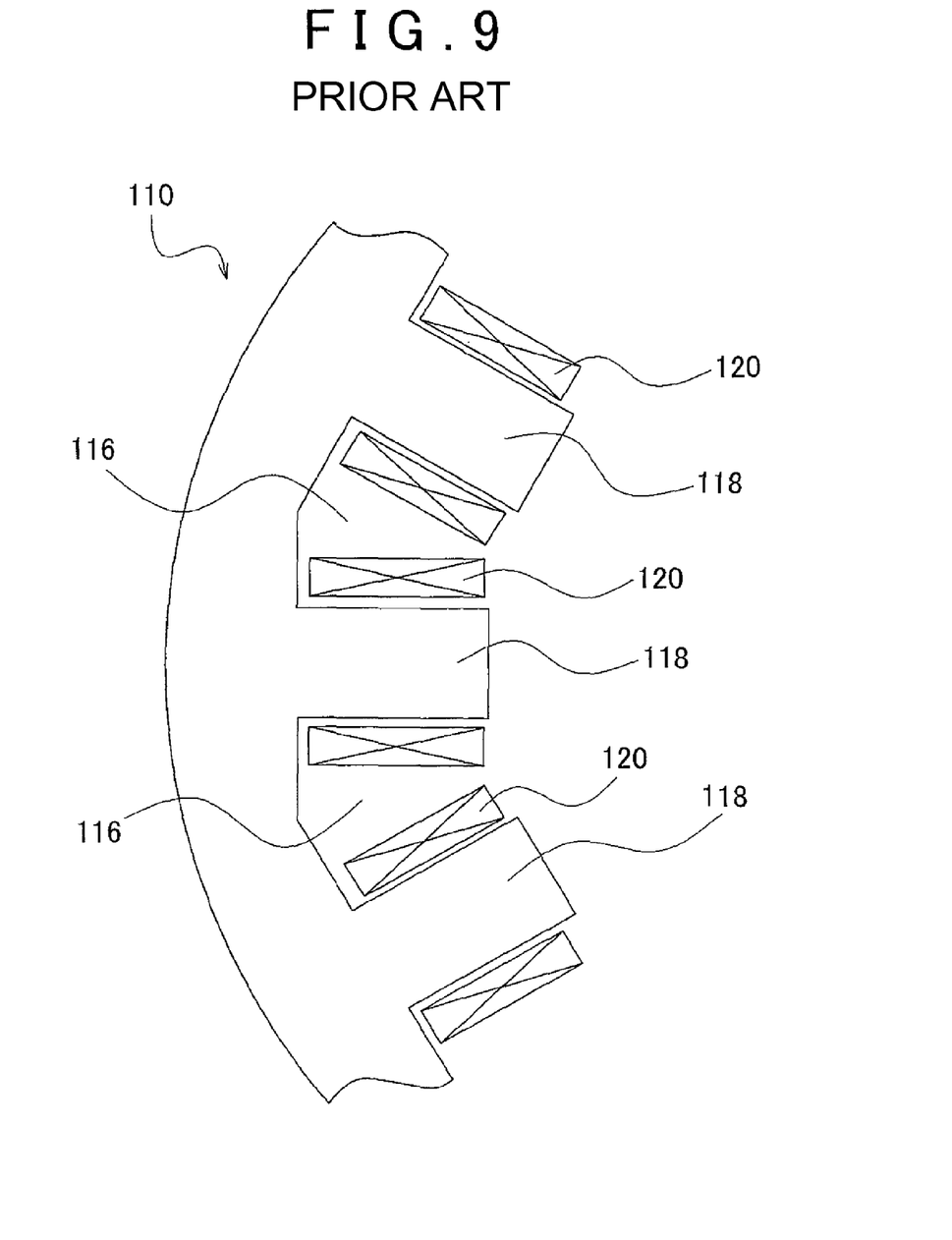
FIG. 9 is a view that illustrates the stator core according to the related art.

A trapezoidal coil 114 that follows the shape of the trapezoidal tooth 112 is assembled to the trapezoidal tooth 112. When the cross section of the tooth and the coil has the trapezoid shape, the density of the coil in the slot 116 improves in comparison with a case where the cross section of the tooth and the coil has a rectangular shape as shown in FIG. 9. The fact described above shows that the rotating electrical device can be downsized while maintaining the output by using the trapezoidal tooth 112.

Figure 10:
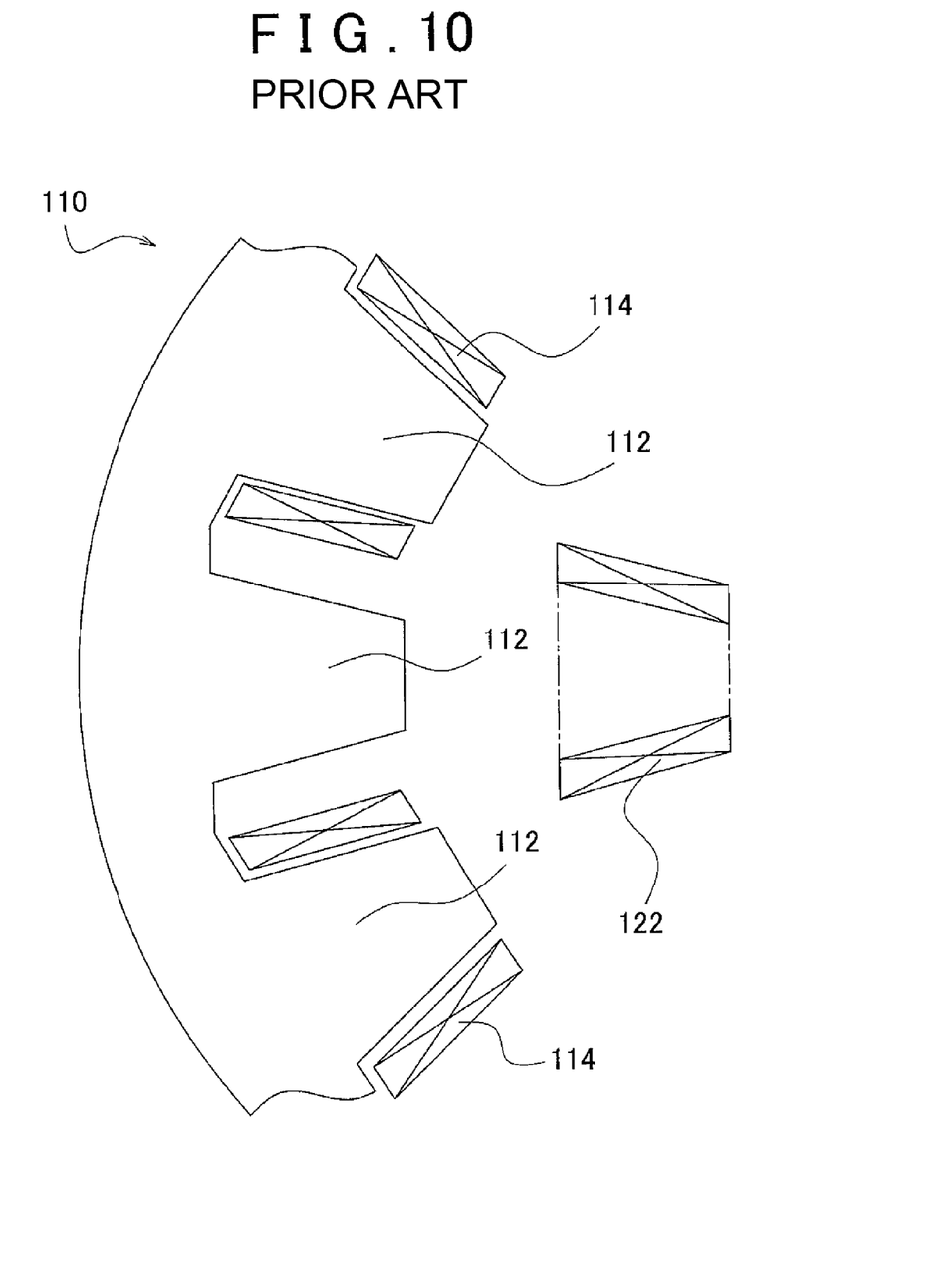
FIG. 10 is a view that illustrates the stator core according to the related art.
Figure 11:
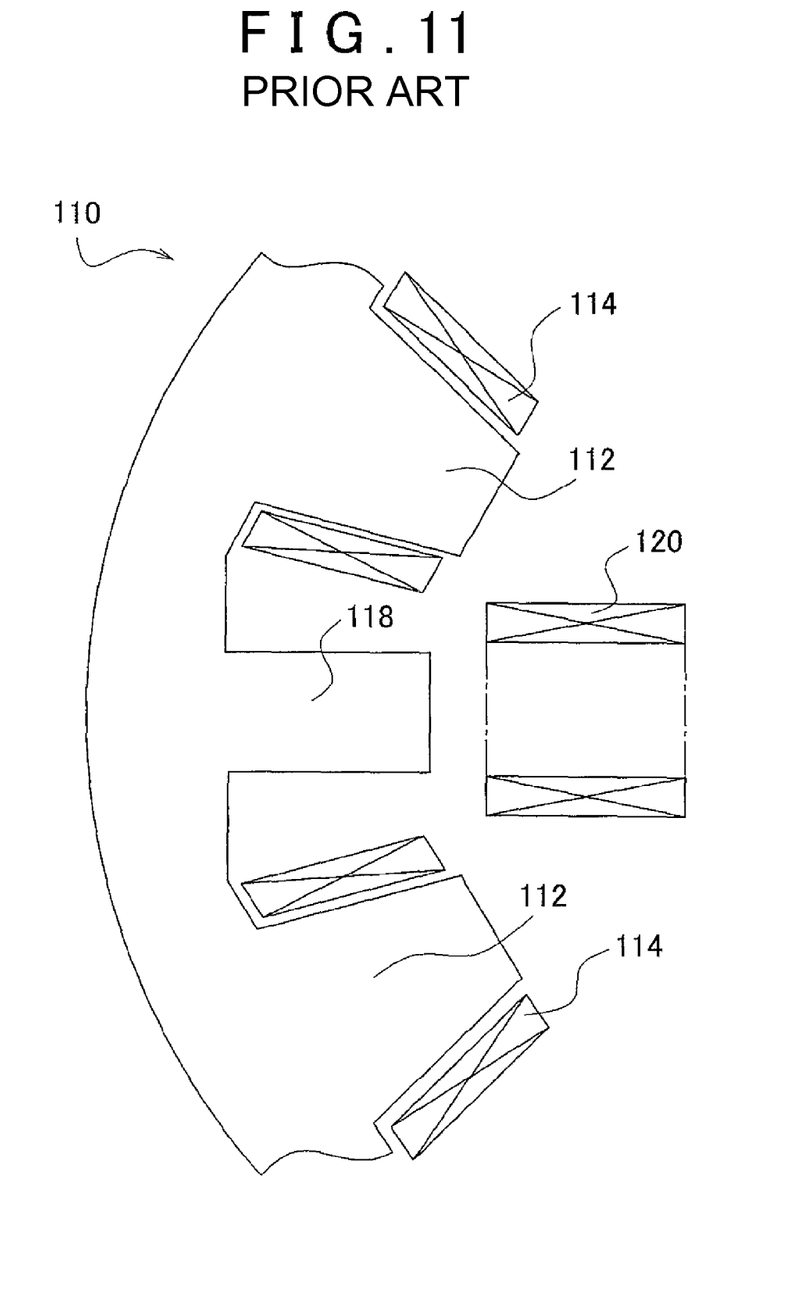
FIG. 11 is a view that illustrates the stator core according to the related art.

As shown in FIG. 10, when a trapezoidal coil 122 is assembled to a designated trapezoidal tooth 112 in a case where a trapezoidal coil 114 has already been assembled to adjacent tooth 112, the trapezoidal coil 122 cannot be assembled to the designated trapezoidal tooth 112. In order to facilitate the assembly of the coil, at least one rectangular tooth 118 is disposed in the stator core 110 other than the trapezoidal teeth 112 as shown in FIG. 11. As shown in FIG. 11, even if the trapezoidal coils 114 are assembled to the adjacent trapezoidal teeth 112, a rectangular coil 120 can be assembled to the rectangular tooth 118. In the assembly of the coils to the teeth, the trapezoidal coil 114 is first assembled to the trapezoidal tooth 112 adjacent to the rectangular tooth 118, and then the trapezoidal coils 114 are sequentially assembled to the trapezoidal teeth 112 along the circumferential direction of the stator core 110, and finally the rectangular coil 120 is assembled to the rectangular tooth 118.

Figure 12:
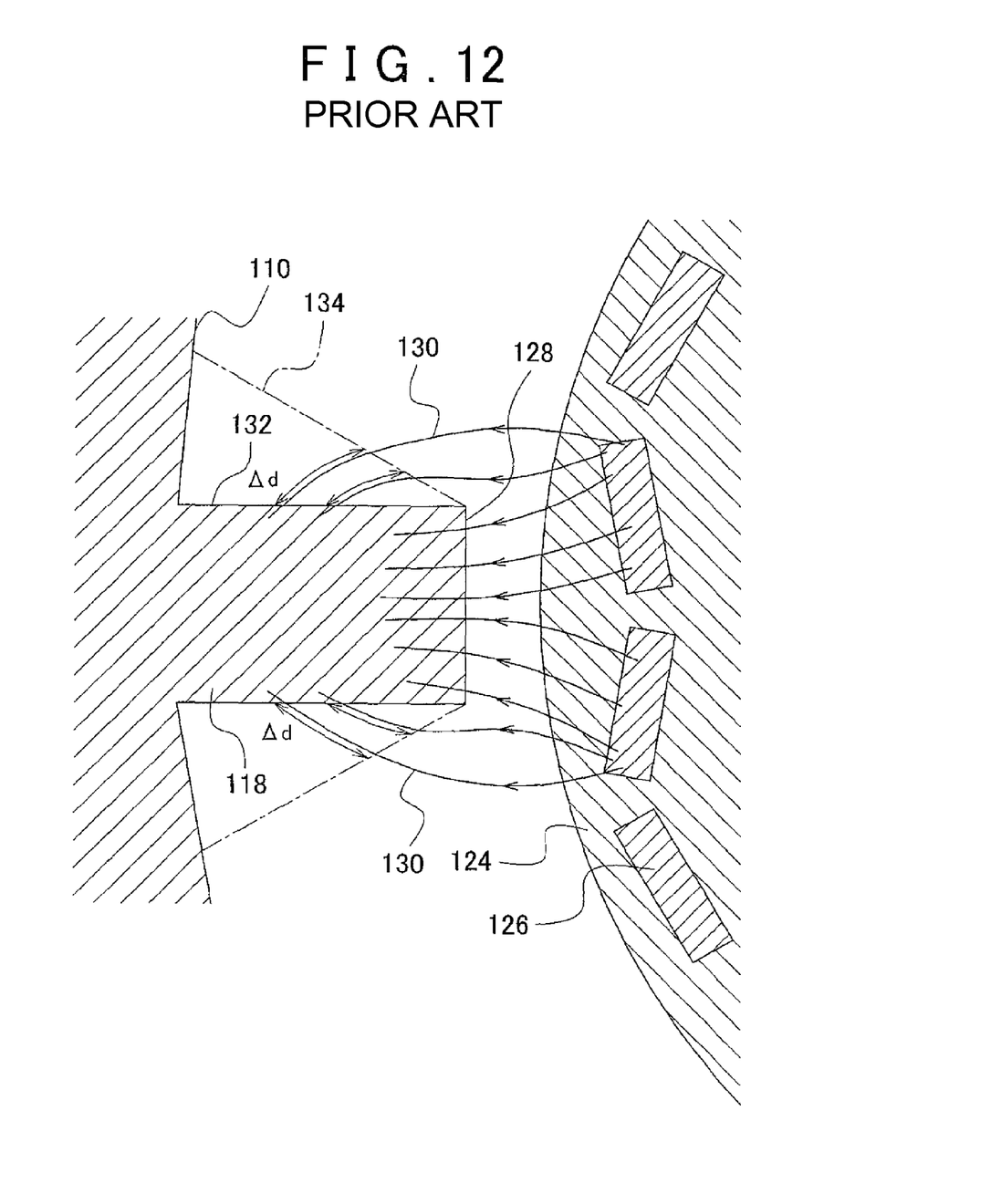
FIG. 12 is a view that illustrates the flow of the magnetic flux from the rotor into the stator in the related art.

Here, the tooth is subjected to magnetic flux from a permanent magnet 126 that is provided in a rotor 124. FIG. 12 shows a schematic view in which the magnetic flux produced by the permanent magnet 126 flows into the tooth. The magnetic flux principally flows from a top surface 128 of the tooth into the tooth, but part of the magnetic flux flows from a side surface 132 of the tooth into the tooth as leakage flux 130. This is because magnetic flux density increases to be saturated in the process of flowing from the permanent magnet 126 into the tooth, and thus the magnetic flux that departs from the top surface 128 of the tooth is produced.

The intensity of the leakage flux 130 differs between a case where the tooth is the trapezoidal tooth 112 and a case where the tooth is the rectangular tooth 118. That is, when a magnetic path from the rotor 124 to the side surface 134 of the trapezoidal tooth 112 (shown with an alternate long and short dash line in FIG. 12) and a magnetic path from the rotor 124 to the side surface 132 of the rectangular tooth 118 are compared, the magnetic path of the rectangular tooth 118 that passes through atmosphere is longer than the magnetic path of the trapezoidal tooth by the length that is indicated with a symbol Δd in FIG. 12. Because the atmosphere has higher magnetic reluctance than metal that is a material of the tooth, the magnetic flux flows through a long atmospheric passage, and therefore the intensity of the magnetic flux is reduced. As a result, total amount of the magnetic flux that flows into the rectangular tooth 118 is smaller than the total amount of the magnetic flux that flows into the trapezoidal tooth 112.

Figure 13:
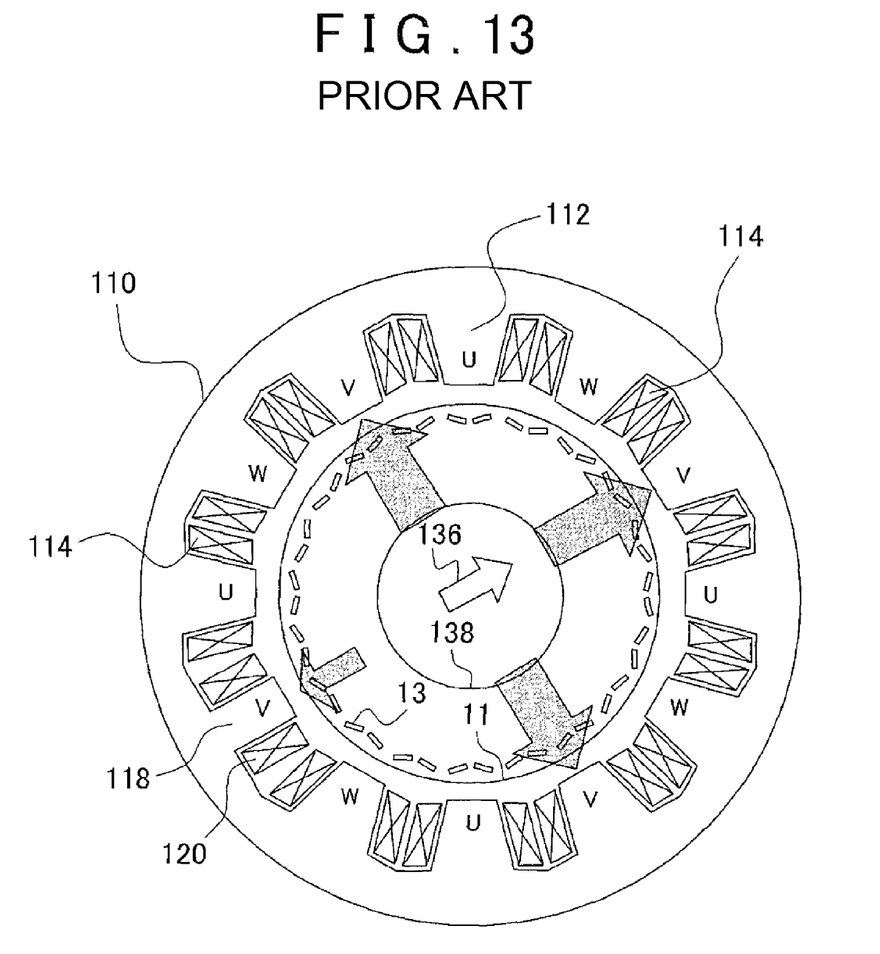
FIG. 13 is a view that illustrates the eccentric force applied to the rotor in the related art.

If the amount of magnetic flux varies due to the shape of the tooth, eccentric force in a radial direction is produced on the rotor 124. The phenomenon will be described with reference to FIG. 13. The rotating electrical device shown in FIG. 13 is a three-phase type alternating-current rotating electrical device, and the rectangular tooth 118 is allocated to a V-phase. When the magnetic flux flows from the permanent magnets 126 of the rotor 124 to the V-phase tooth, if the amount of magnetic flux varies due to the shape of the tooth, electromagnetic force produced on the rectangular tooth 118 and electromagnetic force produced on the trapezoidal tooth 112 facing to the rectangular tooth 118 are not canceled out, and therefore eccentric force 136 is produced in a direction opposite to the rectangular tooth 118. Due to the eccentric force 136, the rotor 124 and a shaft 138 of the rotor 124 are pulled in the direction opposite to the rectangular tooth 118. Thus, rotation of the rotor 124 becomes unstable, noise and vibration characteristics (NV characteristics) of the rotating electrical device deteriorates.

SUMMARY OF THE INVENTION

Here, the present invention provides the stator core that reduces imbalance of the amount of the magnetic flux derived from the shape of the teeth.

A first aspect of the present invention relates to the stator core of the rotating electrical device. The stator core includes a cylindrical yoke and teeth that are disposed in an inner circumference surface of the yoke along its circumferential direction and that are subjected to magnetic flux from the rotor of the rotating electrical device. In addition, the teeth include a trapezoidal tooth that has a trapezoidal cross section that is taken vertically along a central axis of the yoke and an oddly shaped tooth of which a tip section has the same shape as the trapezoidal tooth and a base section from the tip section to the yoke has a different shape from the trapezoidal tooth.

In the aforementioned aspect, the length of the tip section of the oddly shaped tooth may be set at 15% or longer and 30% or shorter of the total length of the oddly shaped tooth in the length along a radial direction of the yoke.

According to the present invention, imbalance of the amount of the magnetic flux derived from the shape of the teeth can be reduced.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
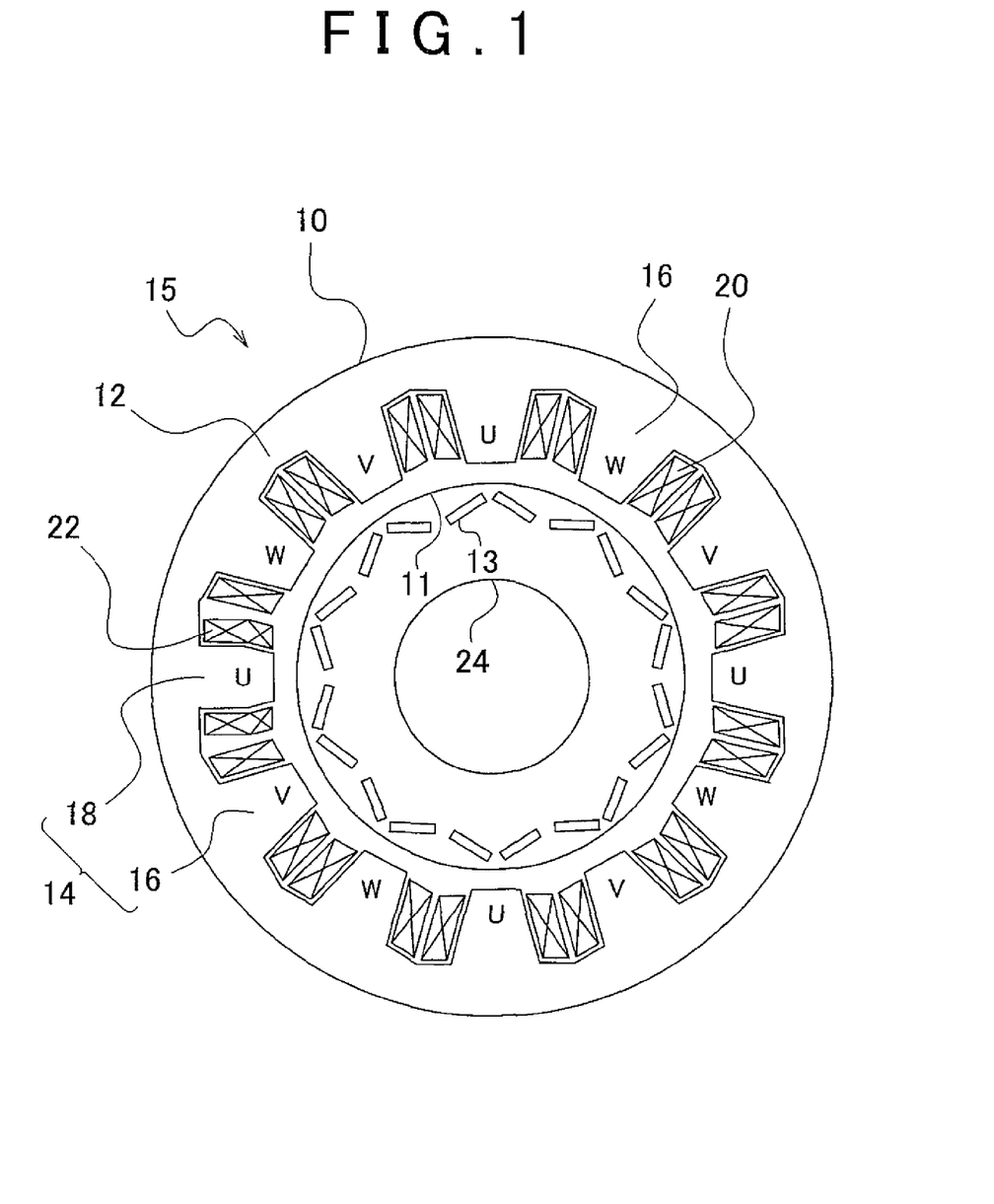
FIG. 1 is a view that illustrates the stator core according to the present embodiment.

FIG. 1 illustrates the stator core 10 according to the present embodiment. The stator core 10 has an approximately cylindrical shape and houses the rotor 11 on an inner circumference side. The stator 15 is formed through assembly of the coil (described below) to the stator core 10. The rotor 11 rotates by rotating magnetic field that is produced by the stator 15. The rotating electrical device that includes the stator 15 and the rotor 11 is used as a motor or a generator for a vehicle, for example. Here, type of the rotating electrical device may be a permanent magnetic motor that includes a permanent magnet 13 in the rotor 11 or a reluctance motor that does not include the permanent magnet 13 in the rotor 11.

The stator core 10 includes a cylindrical yoke 12 and a plurality of teeth 14 that are disposed in an inner circumference surface of the yoke 12 along its circumferential direction and that extend toward a central axis of the yoke 12. The yoke 12 and the teeth 14 are formed in one member and made of a laminated body of silicon steel plates, for example.

The teeth 14 include a trapezoidal tooth 16 and an oddly shaped tooth 18 that has a different shape from the trapezoidal tooth 16. The trapezoidal tooth 16 has a trapezoidal cross section that is taken vertically along the central axis of the yoke 12, and the tooth 16 is formed so as to have a narrower width in a direction toward the center of the yoke 12. In addition, the side surfaces of the adjacent trapezoidal teeth 16 may be formed approximately parallel to each other.

Figure 2:
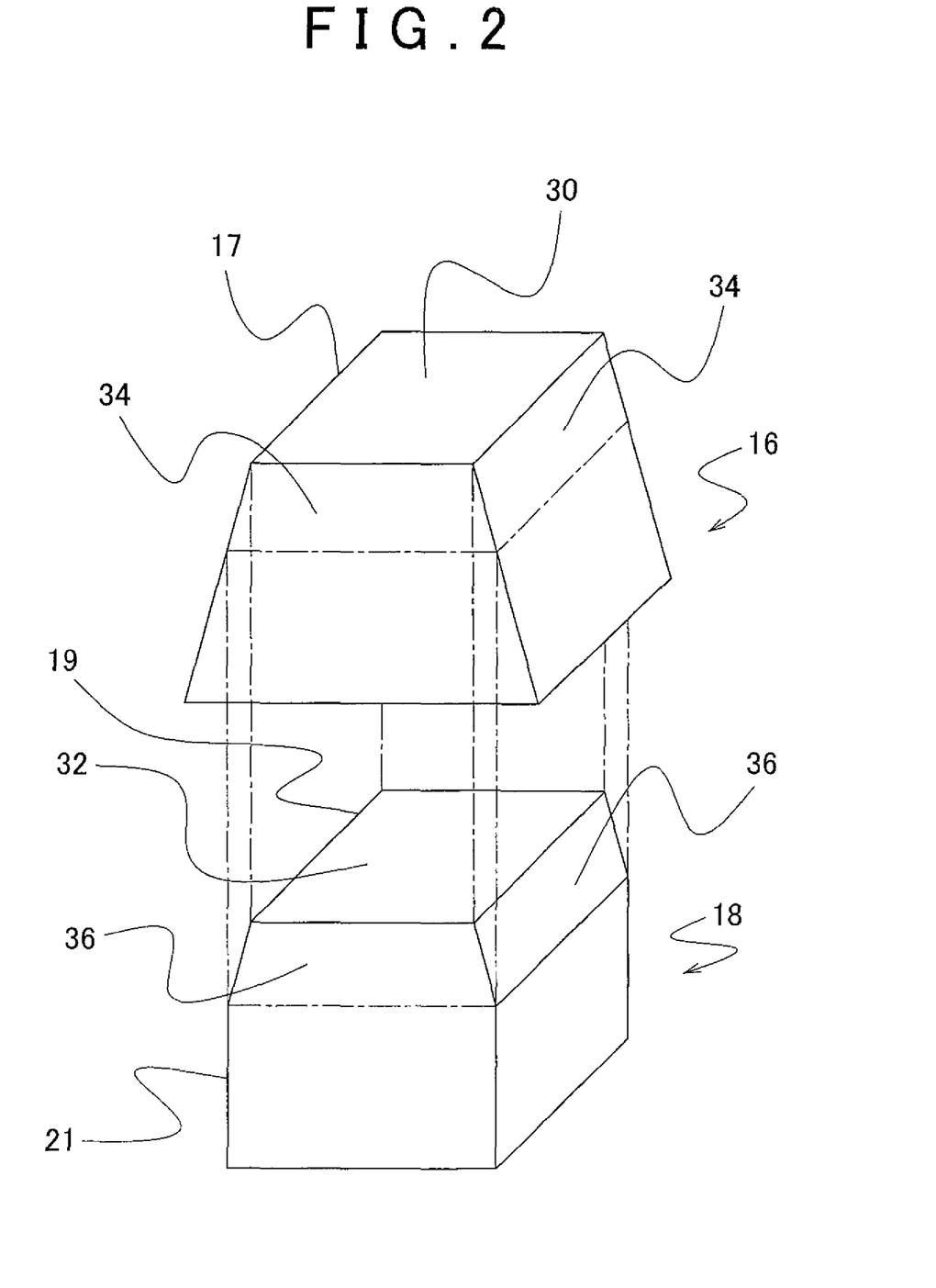
FIG. 2 is a view that illustrates comparison between the shape of an oddly shaped tooth and that of a trapezoidal tooth.

The oddly shaped tooth 18 includes a tip section 19 that has the identical shape as the trapezoidal tooth 16 and a base section 21 that is formed between the tip section 19 and the yoke 12 and has the different shape from the trapezoidal tooth 16. Here, the term "same shape" means that a tip section 17 of the trapezoidal tooth 16 and the tip section 19 of the oddly shaped tooth 18 are geometrically congruent as shown in FIG. 2. That is, it indicates that shapes and areas of a top surface 30 of the tip section 17 of the trapezoidal tooth 16 and a top surface 32 of the tip section 19 of the oddly shaped tooth 18 are equal, and shapes and areas of a side surface 34 of the tip section 17 of the trapezoidal tooth 16 and a side surface 36 of the tip section 19 of the oddly shaped tooth 18 are equal. In addition, an angle between the top surface 30 of the tip section 17 of the trapezoidal tooth 16 and the side surface 34 (cone angle), and an angle between the top surface 32 of the tip section 19 of the oddly shaped tooth 18 and the side surface 36 are identical with each other. According to the condition described above, it is indicated that geometric shapes and volumes of the tip section 17 of the trapezoidal tooth 16 and the tip section 19 of the oddly shaped tooth 18 are equal to each other. Here, the term "identical" includes tolerance in manufacturing the trapezoidal tooth 16 and the oddly shaped tooth 18. For example, the tolerance includes about 5% of deviation from a design value.

Figure 3:
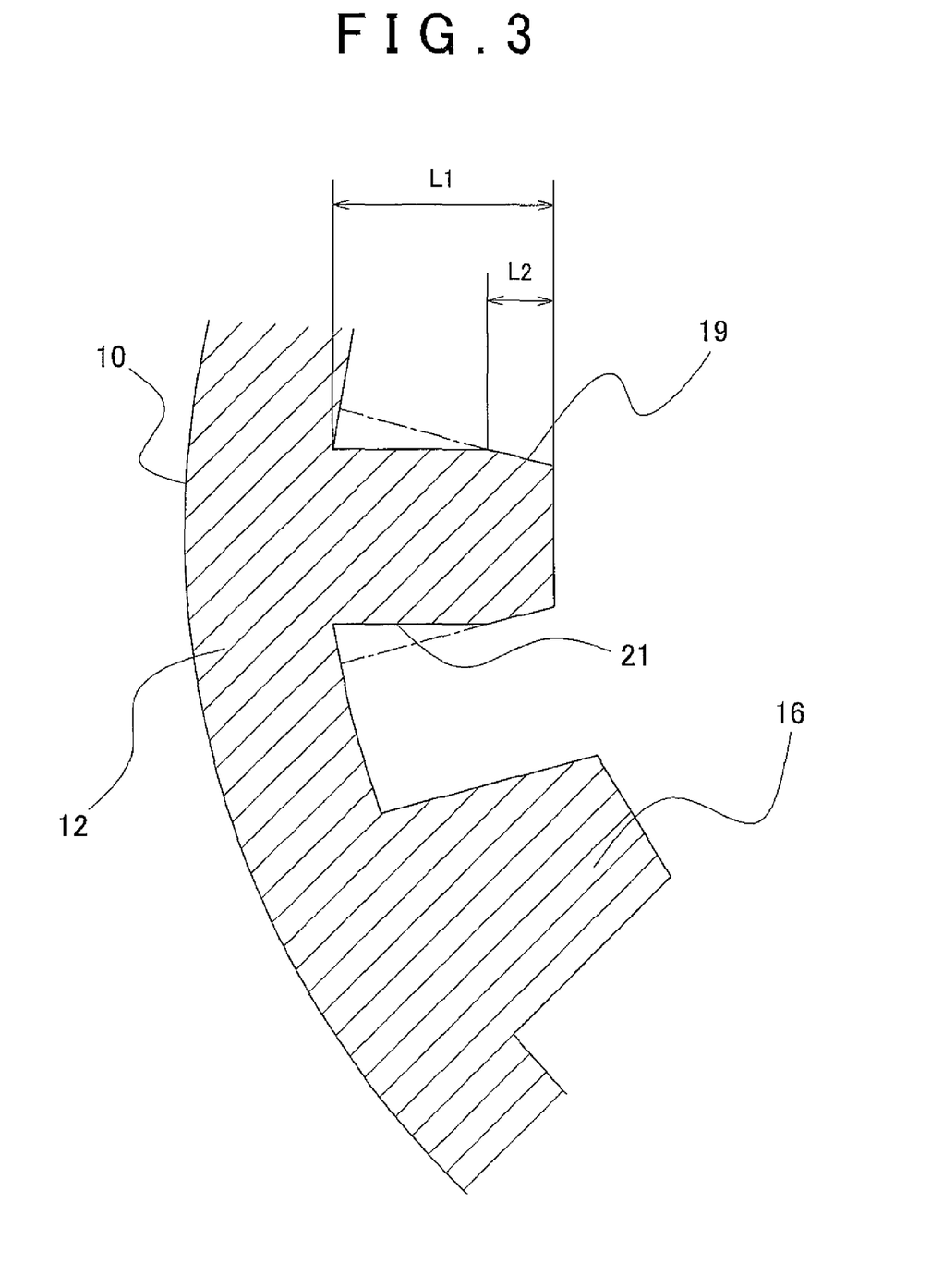
FIG. 3 is an enlarged view of the stator core according to the present embodiment.

As shown in FIG. 3, the length L2 of the tip section 19 of the oddly shaped tooth 18 may be set at 15% or longer and 30% or shorter of the total length L1 of the oddly shaped tooth 18 in the radial direction of the yoke 12. Effects of setting the length L2 of the tip section 19 of the oddly shaped tooth 18 as described above will be described later. In addition, the total lengths of the trapezoidal tooth 16 and the oddly shaped tooth 18 may be identical with each other.

In FIG. 1, the cross section of the base section 21 of the oddly shaped tooth 18 is shown in a rectangle; however, the cross section is not limited to the rectangular shape. In fact, the cross section may be of any shape so that the coil can be inserted into the oddly shaped tooth 18 even when the trapezoidal coil 20 is inserted into the adjacent trapezoidal teeth 16; for example, the cross section of the base section 21 may be formed in a trapezoid that has a narrower (thinner) width than the trapezoidal tooth 16.

Returning to FIG. 1, the coil is assembled to the trapezoidal tooth 16 and the oddly shaped tooth 18 in which the coil is formed to follow the shapes of respective teeth. Hereinafter, the coil that is assembled to the trapezoidal tooth 16 is referred to as a trapezoidal coil 20, and the coil that is assembled to the oddly shaped tooth 18 is referred to as an oddly shaped coil 22. Here, the trapezoidal coil 20 and the oddly shaped coil 22 may be edgewise coils that are so-called concentrated winding coils and formed by winding cooper rectangular wires in the thickness direction, for example. Besides the edgewise coils, the trapezoidal coil 20 and the oddly shaped coil 22 may be round wire coils in which cooper round wires are wound around bobbins, and furthermore the coils may be flat winding coils in which cooper rectangular wires are wound around the bobbins.

Figure 4:
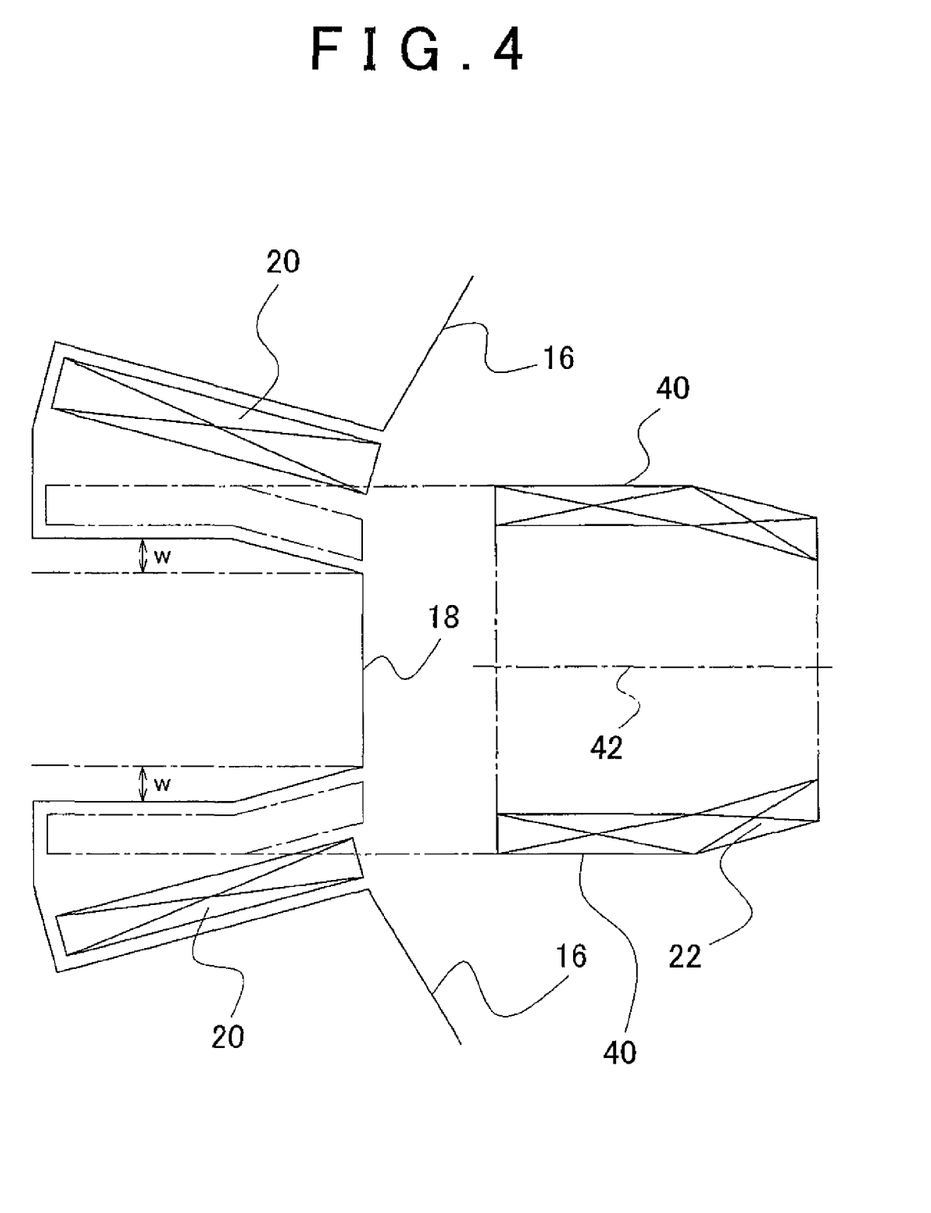
FIG. 4 is an enlarged view of the stator core according to the present embodiment.

When the tooth shape is changed from the rectangular tooth according to the related art to the oddly shaped tooth 18 according to the present embodiment, the width of the oddly shaped tooth 18 increases as shown with a reference symbol w in FIG. 4. Associated with the increase of the width, the tip section of the trapezoidal coil 20 that has already been assembled to the trapezoidal tooth 16 may contact with the base section of the oddly shaped coil 22 during the assembly of the coil to the oddly shaped tooth 18, and the oddly shaped coil 22 is hardly assembled to the oddly shaped tooth 18. For this reason, during the assembly of the oddly shaped coil 22, a base section side outer circumference surface 40 of the oddly shaped coil 22 is elastically deformed toward a central axis 42 of the oddly shaped coil 22 and assembled to the oddly shaped tooth 18 in a state where diameter on a base section side is reduced. Through the reducing deformation of the diameter on the base section side, the oddly shaped coil 22 can avoid contact with the tip section of the trapezoidal coil 20 and can be inserted into the oddly shaped tooth 18. After passing nearby the tip section of the trapezoidal coil 20, the oddly shaped coil 22 returns to its original shape by its elasticity. Furthermore, the tip section of the oddly shaped coil 22 has a shape that follows the shape of the tip section of the oddly shaped tooth 18 and therefore never contacts with the adjacent trapezoidal coil 20.

Although an oddly shaped teeth 18 is disposed in the stator core 10 in FIG. 1, the oddly shaped teeth 18 are not limited to this disposition. In consideration of enabling the assembly of the coil, at least one oddly shaped tooth 18 may be disposed in the stator core 10.

The rotor 11 is housed on the inner circumference side of the stator core 10. The rotor 11 is fitted and secured onto a shaft 24. Thus, the rotation of the rotor 11 is transmitted to the shaft 24, and the rotation is transmitted from the shaft 24 to a power transmission device (power train; not shown) of the vehicle. In the present embodiment as shown in FIG. 1, a permanent magnet 13 is assembled to the rotor 11 by means of casting or the like. The permanent magnet 13 is preferably made of a rare-earth magnet such as a neodymium magnet. The magnetic flux produced by the permanent magnet 13 flows into the teeth 14 of the stator core 10.

Here, the present inventors have found that, by constituting the length L2 of the tip section 19 of the oddly shaped tooth 18 at 15% or longer and 30% or shorter of the total length L1 of the oddly shaped tooth 18, the amount of the magnetic flux that flows into the oddly shaped tooth 18 becomes approximately equal to that of the trapezoidal tooth 16. According to the finding, imbalance of the amount of the magnetic flux between the trapezoidal tooth 16 and the oddly shaped tooth 18 is reduced, and therefore the eccentric force applied to the rotor 11 can be reduced.

Figure 5:
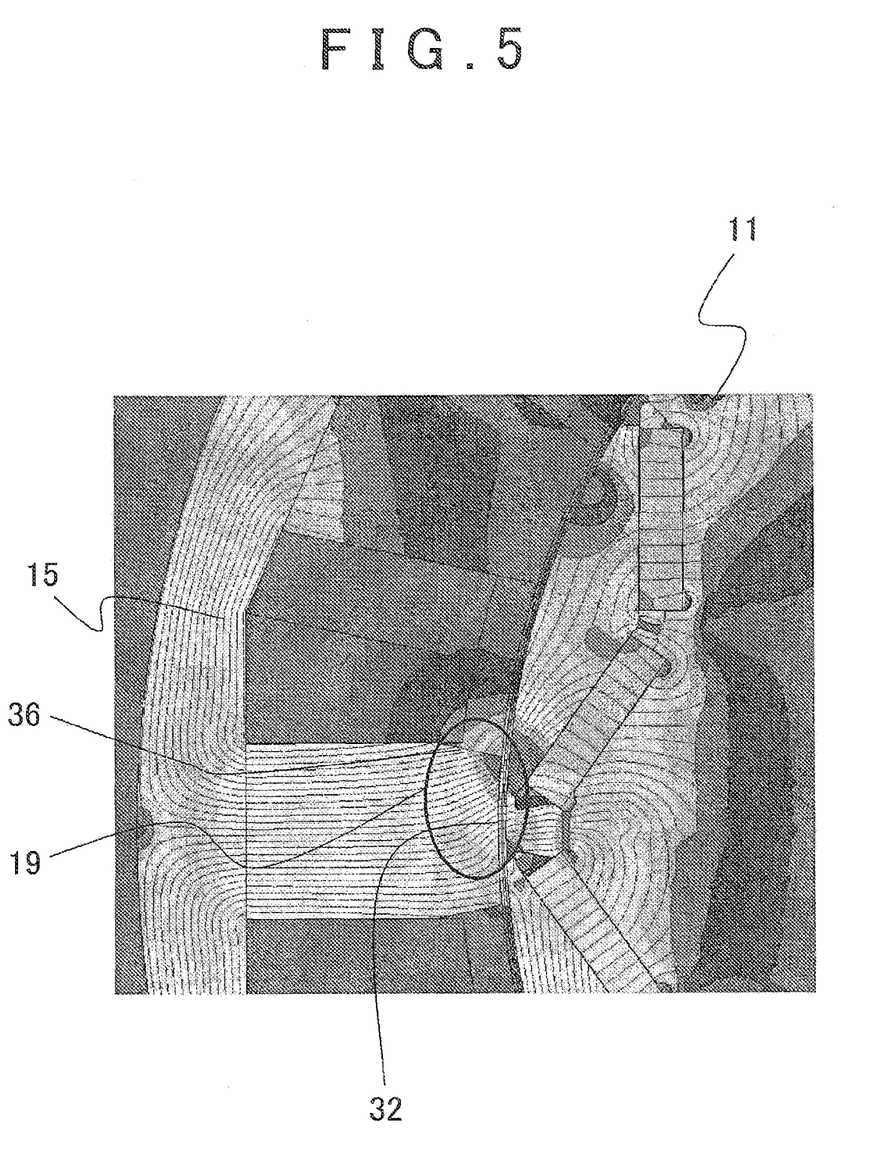
FIG. 5 is a view that illustrates an analysis result of magnetic flux in the stator core according to the present embodiment.

FIG. 5 shows the result of flow analysis of the magnetic flux between the rotor 11 and the stator 15. The magnetic flux is indicated with lines that are drawn on the rotor 11 and the stator 15, and the intensity of the magnetic flux is indicated with the depth of a color around the line. Referring now to an encircled portion of FIG. 5, the color of the tip section 19 of the oddly shaped tooth 18 is turned darker from the top surface 32 to the side surface 36, or that is to say, the magnetic flux density increases. Furthermore, in the side surface 36, the magnetic flux density decreases as approaching the yoke 12. In other words, it is understood that a major part of the leakage flux that flows into the side surface of the oddly shaped tooth 18 is concentrated in the tip section 19 of the oddly shaped tooth 18. Through the aforementioned result, it is understood that, by forming only the tip section of the oddly shaped tooth 18 into the same shape as the trapezoidal tooth 16, the amount of the magnetic flux of the oddly shaped tooth 18 becomes approximately equal to that of the trapezoidal tooth 16. As a result of analysis by the present inventors, it is found that, by setting the length L2 of the tip section 19 of the oddly shaped tooth 18 to 15% or longer and 30% or shorter of the total length L1 of the oddly shaped tooth 18, the amount of the magnetic flux of the oddly shaped tooth 18 becomes approximately equal to that of the trapezoidal tooth 16.

Figure 6A:
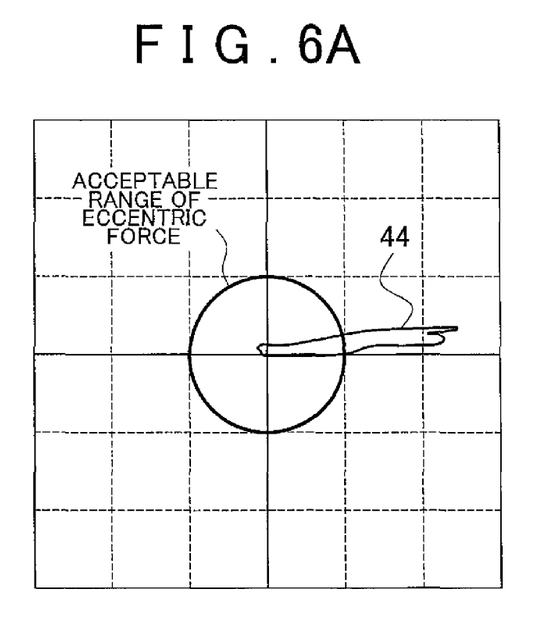
FIG. 6 is a diagram that illustrates eccentric force applied to the rotor.
Figure 6B:
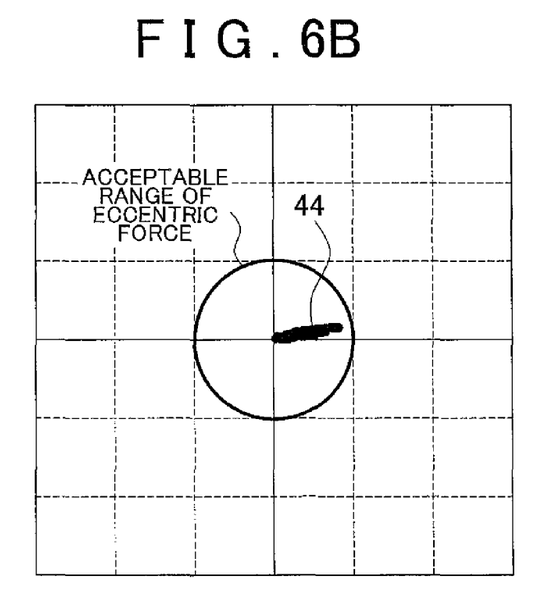
Figure 7:
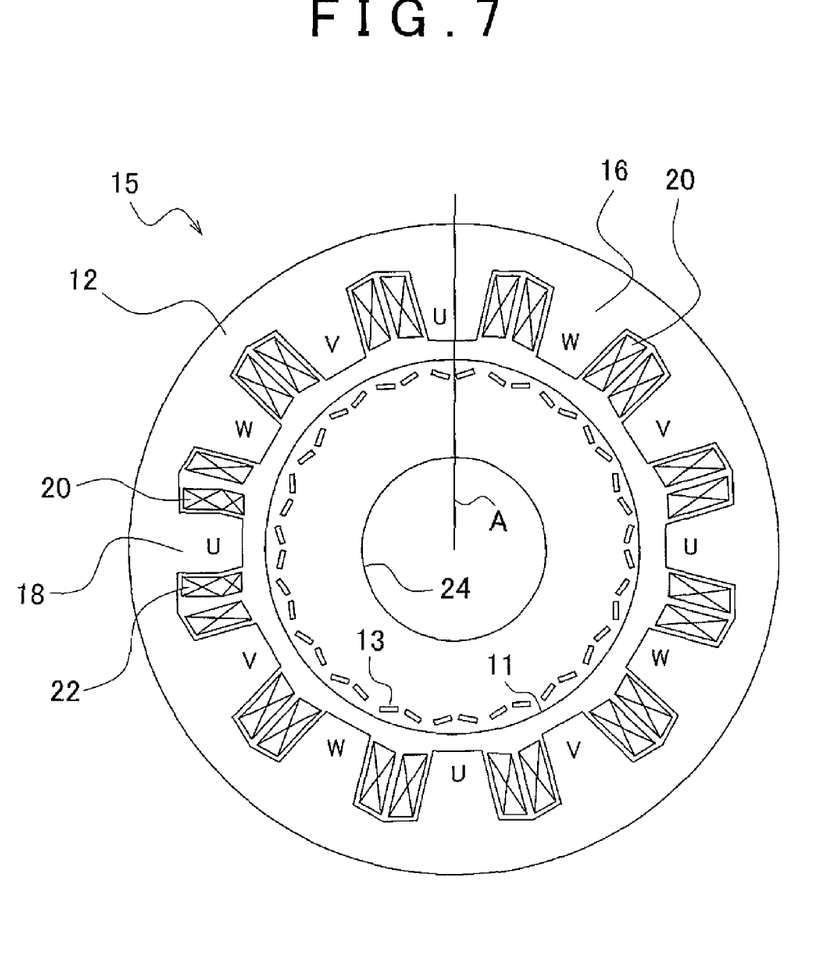
FIG. 7 is a view that illustrates the stator core according to the present embodiment.

FIG. 6B shows a locus of the eccentric force applied to rotor 11 when the oddly shaped tooth 18 is disposed in the stator core 10. FIG. 6A is a comparative example and shows the eccentric force applied to the rotor 11 when the rectangular tooth according to the related art instead of the oddly shaped tooth 18 is disposed. In either case, a locus 44 of the eccentric force in one rotation of the rotor 11 is shown. Also, in either case, only one oddly shaped tooth 18 or rectangular tooth is disposed in the stator core 10 in a position of 90° in a counterclockwise direction from a reference line A as shown in FIG. 7, and the trapezoidal teeth 16 are disposed in other positions.

For the eccentric force applied to the rotor 11, the acceptable range is predetermined as shown with a circle in FIG. 6. Such the acceptable range is obtained as a range that does not affect the noise and vibration characteristics (NV characteristics) by experiment and the like in advance. When the rectangular tooth is used, it is understood that the eccentric force is produced on the side opposite to the rectangular tooth and deviates from the acceptable range as shown in FIG. 6A. On the other hand, when the oddly shaped tooth 18 according to the present embodiment is used instead of the rectangular tooth, although the eccentric force is produced on the side opposite to the oddly shaped tooth 18, the magnitude of the eccentric force is considerably reduced in comparison with that of the rectangular tooth, the eccentric force falls within the acceptable range.

As described above, the present invention uses, as the teeth 14 that are disposed in the stator core 10, the trapezoidal tooth 16 as well as the oddly shaped tooth 18 of which the tip section 19 has the same shape as the trapezoidal tooth 16 and the base section 21 has the different shape from the trapezoidal tooth 16. Through the disposition of such the oddly shaped tooth 18, the difference in the amount of the magnetic flux between the trapezoidal tooth 16 and the oddly shaped tooth 18 is reduced in comparison with the rectangular tooth according to the related art, and therefore the eccentric force applied to the rotor 11 is also reduced. In addition, the base section 21 of the oddly shaped tooth 18 is formed in a rectangle cross section and the like such that the coil can be inserted even when the trapezoidal coils 20 are inserted into the adjacent trapezoidal teeth 16. Therefore, in the assembly of the coil, the ease of the assembly of the oddly shaped coil 22 approximately equal to the assembly using the rectangular coil is maintained.

As shown in FIG. 1, when the rotating electrical device is a three-phase type alternating-current rotating electrical device, it is preferable that the oddly shaped tooth 18 is equally allocated to each phase. As shown in FIG. 6B, the difference in the amount of the magnetic flux between the trapezoidal tooth 16 and the oddly shaped tooth 18 is reduced in comparison with the rectangular tooth according to the related art; however, there is still a slight difference in the amount of the magnetic flux between the trapezoidal tooth 16 and the oddly shaped tooth 18. Thus, by equally allocating the oddly shaped tooth 18 to each phase, the creation of the imbalance of the amount of the magnetic flux among respective phases can be avoided, and induced voltage (counter electromotive force) associated with the amount of the magnetic flux can be equalized among the respective phases.

What is claimed is:
1. A stator core of a rotating electrical device comprising:
a cylindrical yoke; and
a trapezoidal tooth and an oddly shaped tooth that are disposed in an inner circumference surface of the yoke along the circumferential direction and that are subjected to magnetic flux from the rotor of the rotating electrical device, wherein
the trapezoidal tooth that has a trapezoidal cross section that is taken vertically along a central axis of the yoke from a top surface to the yoke, and wherein
a tip section of the oddly shaped tooth has the same shape as the trapezoidal tooth and a base section of the oddly shaped tooth from the tip section to the yoke has a different shape from the trapezoidal tooth.

2. The stator core according to claim 1, wherein length of the tip section of the oddly shaped tooth is set at 15% or longer and 30% or shorter of total length of the oddly shaped tooth in the length along a radial direction of the yoke.

3. The stator core according to claim 1, wherein the total length of the trapezoidal tooth is the same as the total length of the oddly shaped tooth in the radial direction of the yoke.

4. The stator core according to claim 1, wherein the base section of the oddly shaped tooth has a rectangular cross section that is taken vertically along the central axis of the yoke.

5. The stator core according to claim 1, wherein the base section of the oddly shaped tooth has a trapezoidal cross section that is taken vertically along the central axis of the yoke in which width of the trapezoidal cross section is narrower than that of the trapezoidal tooth.

6. The stator core according to claim 1, wherein the rotating electrical device is a three-phase type alternating-current rotating electrical device, and the trapezoidal tooth and the oddly shaped tooth are disposed in each phase such that proportion of the teeth is equally allocated.

7. The stator core according to claim 1, wherein the tip section of the oddly shaped tooth that has the same shape as the trapezoidal tooth includes a top surface and portions of both side surfaces.

8. The stator core according to claim 1, wherein the tip section of the oddly shaped tooth that that has the same shape as the trapezoidal tooth includes a trapezoidal cross-section that is taken vertically along the central axis of the yoke.

* * * * *